(12) United States Patent
El-Damhougy et al.

(10) Patent No.: US 7,764,622 B2
(45) Date of Patent: Jul. 27, 2010

(54) INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK

(75) Inventors: Hersham El-Damhougy, Tustin, CA (US); Keith Jerelt, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 11/613,839

(22) Filed: Dec. 20, 2006

(65) Prior Publication Data
US 2008/0151811 A1 Jun. 26, 2008

(51) Int. Cl.
*H04W 24/00* (2009.01)
(52) U.S. Cl. ...................................... 370/252
(58) Field of Classification Search ................. 370/252
See application file for complete search history.

(56) References Cited
OTHER PUBLICATIONS

Akyildiz et al., 'TCP-Peach: A New CongestionControl Scheme for Satellite IP Networks', IEEE/ACM Transactions On Networking, vol. 9, No. 3, Jun. 2001, pp. 307-321.*
Akan et al., "Performance of TCP Protocols in Deep Space Communication Networks", IEEE Communications Letters, vol. 6, No. 11, Nov. 2002, pp. 478-480.*
Ian F. Akyildiz et al., "TCP-Planet: A Reliable Transport Protocol for InterPlaNetary Internet"; IEEE Journal on Selected Areas in Communications, vol. 22, No. 2, Feb. 2004.
Loren P. Clare et al., "Space-based Multi-hop Networking"; Computer Networks 47 (2005) 701-724.
Michael D. Noakes et al., "An Adaptive Link Assignment Algorithm for Dynamically Changing Topologies"; IEEE Transaction on Communications, vol. 41, No. 5, May 1993.
Chien-Chung Shen et al., "A flexible routing architecture for ad hoc space networks"; Computer Networks, vol. 46, No. 3, Oct. 2004.
Chien-Chung Shen et al., "Interrogation-Based Relay Routing for Ad Hoc Satellite Networks"; IEEE Globecom, Taipei,. Taiwan, Nov. 17-21, 2002.
Akyildiz et al., "InterPlaNetary Internet: state-of-the-art and research challenges," Computer Networks, 43 (2003).

* cited by examiner

*Primary Examiner*—Melvin Marcelo
(74) *Attorney, Agent, or Firm*—Law Office of Charles W. Peterson, Jr.

(57) ABSTRACT

An interplanetary communications network, an interplanetary communications backbone network of Artificial Neural Network (ANN) nodes, an ANN node and a method of managing interplanetary communications. The backbone network operates as a neural network with each node identifying optimum paths, e.g., end-to-end through the backbone network from a distant planet to an earth node. Each node maintains a window matrix identifying reoccurring (e.g., periodically) communications windows between nodes and a propagation delay matrix identifying time varying propagation delays between nodes. Each node determines whether and how long to store packets locally to minimize path delays. Each node also maintains a link cost matrix indicating the cost of links to neighboring nodes and further determines whether and how long to store packets locally to minimize path delays at minimal link cost.

59 Claims, 10 Drawing Sheets

202 — INPUT: NETWORK GRAPH G = (V, E($t_0$)), s: SOURCE NODE, $t_0$: STARTING TIME, D($t_0$), $t_0$

204 — OUTPUT: L

206 — INITIALIZATION: P ← Φ(EMPTY SET),

L[s]←0, L[v]←∞ FOR ALL v ∈ V s.t. v ≠ s.

208 — WHILE P ≠ V DO

LET u ∈ V \ P BE THE NODE s.t L[u] = MIN $_{x \in P}$ L[x]

P = P ∪ {u}

210 — FOR EACH EDGE e ∈ E; s.t e = (u; v) do

IF L[v] > (L[u] + D(e; L[u] + $t_0$)) THEN

L[v] ← L[u] + D(e; L[u] + $t_0$)

END IF

END FOR

END WHILE

WHERE:
- D(e; L[u] + $t_0$)) = $D_v^u$(L(u) + $t_0$) ; e = (u,v)
- L: ARRAY RETURNING THE COST OF THE SHORTEST PATH TO ALL NODES

FIG. 5

INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK

CROSS REFERENCE TO RELATED APPLICATION

The disclosure is related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. patent application Ser. No. 11/426,417, entitled "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVITY PREDICTIONS FOR MOBILE AD HOC RADIO NETWORK," U.S. patent application Ser. No. 11/426,425, entitled "NEURAL NETWORK-BASED MOBILITY MANAGEMENT FOR SELF-PARTITION DETECTION AND IDENTIFICATION OF MOBILE AD HOC RADIO NETWORKS," and U.S. patent application Ser. No. 11/426,428, entitled "NEURAL NETWORK-BASED MOBILITY MANAGEMENT FOR HEALING MOBILE AD HOC RADIO NETWORKS," to Hesham El-Damhougy, all four filed Jun. 26, 2006, assigned to the assignee of the present application and incorporated herein by reference.

BACKGROUND

1. Technical Field

The embodiments of the disclosure generally relate to ad-hoc communications networks and, more particularly, to an ad-hoc interplanetary communications network for adaptable deep-space communications in an unstructured and self-supervised interplanetary or sub-planetary environment, such as between deep-space or lunar probes and earth.

2. Background Description

The National Air and Space Administration (NASA) is planning for future outer space exploration and, especially, for deep space interplanetary exploration in our solar system and beyond. Current plans allow for a yet-to-be-designed and developed interplanetary communications network to provide communication services between space borne entities (including deep space entities) and the earth. Primarily, the interplanetary communications network is expected to provide communication services for scientific data delivery and also provide navigation services for exploration spacecraft and orbiters in future deep space missions. The current vision for the infrastructure of this interplanetary communications network is similar to the Internet. See, e.g., Akyildiz et al., "InterPlaNetary Internet: state-of-the-art and research challenges," *Computer Networks,* 43 (2003). This as yet unrealized interplanetary communications network infrastructure or, Interplanetary Internet, is enabling networking technology for future deep space scientific exploration missions such as Mars and Neptune exploration and beyond.

Generally, an interplanetary communications network is expected to include communication between nodes at various space borne entities or locations, e.g., at fixed (celestially fixed) and/or mobile communications platforms. Individual nodes may include, for example, fixed (on a planet surface) sensors, and mobile nodes, e.g., robotics as well as human operated nodes. The nodes are expected to be distributed at numerous space borne locations and deep space entities. These entities may include, for example, robotic spacecraft and Crew Exploration Vehicles (CEV's); planetary platforms, e.g., orbital, local flight and surface planet (mobile and fixed) vehicles; and, sub-planetary probes, e.g., on moons, satellites, and asteroids.

Neither terrestrial Internet-based routing nor terrestrial mobile ad hoc routing protocols satisfy space communications parameter requirements because of additional constraints and requirements for space communications, such as burst data transfers between nodes in a short transfer window. A typical Earth-based wireless network includes fixed communications backbone nodes (e.g., base stations) that define cells, for example, connected together in the network. An earth network that lacks the fixed communications backbone nodes is known as an ad-hoc network. Instead, a group of autonomous (and frequently mobile) nodes define the ad-hoc Earth network. However, since there is no fixed frame of reference in space, node locations are in constant motion with respect to one another even at rest. Consequently, backbone network structure is expected to be fluid and continually, dynamically changing, whether as a result of planetary rotation or orbital movement. Dynamically changing node locations cause connectivity among the network nodes to vary with time. Further, connectivity may change because of other interference, such as blockage of the line-of-sight communications path by a planet or from extra-network interference, e.g., sunspot activity. This continual connectivity change makes network infrastructure time varying also and difficult to pre-define, especially as the total number of nodes gets large. Thus, the interplanetary communications network is expected to be an ad-hoc network, primarily of autonomous nodes self-managing and self-maintaining connectivity in spite of the fluidity of the network communication paths.

These autonomous nodes must assure some form of network connectivity to maintain end-to-end communications for mission success. This is especially important for exchanging large volumes of data that may be collected by various space borne network platforms. Therefore, the network nodes themselves must automatically self-configure/self-provision nodes/platforms along network paths to deliver the expected volume of data. Furthermore, this must be with minimal or no manual intervention/interference, as none may be available. Given that even when a communications window is available between two nodes, there may still be a relatively long transmission path lag time or propagation delay, even between two relatively close communicating nodes, e.g., on the moon and on the Earth. Therefore, Akyildiz et al. describe several significant challenges and issues that must be addressed and resolved before interplanetary communications network objectives may be realized.

Specifically, backbone layer routing is a serious problem area with key previously unresolved challenges. Traditional Shortest Path Algorithms (SPA) include, for example, the Bellman-Ford algorithm and Dijkstra's algorithm. The Bellman-Ford algorithm has been realized by the known Internet Border Gateway Protocol (BGP). Dijkstra's algorithm has been realized by the Internet Open Shortest Path First (OSPF) protocol for Autonomous Systems (AS). The interplanetary communications network will not have a traditional end-to-end path because of long periods (minutes, hours or even days) of no connectivity between nodes and groups of nodes. End-to-end connectivity is not guaranteed and, if it occurs, it may be only sporadic. Therefore, traditional end-to-end routing approaches are unsuitable for interplanetary communications network routing. Moreover, because of nodal motion, it may be difficult to identify an end-to-end path because performance/routing metrics (e.g., propagation and connectivity metrics) are time-dependent. Consequently, optimal or sub-optimal routes are time-dependent. This time-dependence makes both the Bellman-Ford algorithm and Dijkstra's algorithm inadequate.

With current technology achieving significant distances in space, such as interplanetary space travel, interplanetary missions currently take years to reach their objectives. Subsequently, distant nodes are likely to be the oldest and have the oldest equipment. Consequently, storage that increases in density with each new generation, for example, is likely to be denser and more plentiful at nodes closer to earth and scarcer at distant nodes. Thus, storage capacity may be in short supply and, therefore, very costly at these distant nodes as well as other intervening nodes in the network paths. As a result, long term storage requirements for storing data when a connection is unavailable can cause storage contention and overflow at those distant or intervening nodes, e.g., from data arriving simultaneously from several distant nodes. Therefore, locating and planning an optimal route requires complete knowledge and consideration of network path resources as well as key time-dependent network parameters, e.g., contact times and orbital parameters, and traffic loads and node queuing delays.

Furthermore, an interplanetary communications network is likely to be an amalgamation of sub-networks that are based on different distinct network protocols. These distinct network protocols must communicate with the network through strategically located gateways. However, maintaining an even data traffic flow between network nodes that are based on different distinct such network protocols requires that network gateways seamlessly convert between network protocols. Though gateway positions are predictable, they are also normally time varying (e.g., satellites orbiting about a distant planet). This variation in location further complicates gateway selection and handover by network nodes, both locally to the gateway and in the network backbone.

Accordingly, there is a need for a self organizing interplanetary communications network for communicating between earth and exploration and data collecting probes, both manned and unmanned and, more particularly, for transporting mission critical data with minimum delay and data loss.

SUMMARY

An advantageous embodiment includes an interplanetary communications network, an interplanetary communications backbone network utilizing an Artificial Neural Network (ANN) at each node. Each ANN at network nodes provides an on-line real time estimation of node weights/metrics needed to compute the shortest path between two nodes of the interplanetary communications network (in particular the backbone network). The backbone network operates as an autonomous network with each node identifying a path or paths through the backbone network from a distant planet to an earth node. The identified paths may be end-to-end complete optimum paths or an optimum next hop to the next node along an optimum end-to-end path. Each node maintains a window matrix identifying communications windows between nodes and a propagation delay matrix identifying time varying propagation delays between nodes. Each node determines whether and how long to store packets locally to minimize path delays. Each node also maintains a link cost matrix indicating the cost of links to neighboring nodes and further determines whether and how long to store packets locally to minimize path delays at minimal link cost.

Advantageously, a backbone network in a preferred interplanetary communications network provides robust end-to-end network routing. Backbone routing may be accomplished by one of two preferred algorithms that are suitable for interplanetary network, time dependent link state routing or time dependent hop-by-hop distance vector optimization. For time dependent link state routing a complete path is identified from each node to every other node in the network and may be based on a modified Dijkstra Algorithm. For time dependent hop-by-hop distance vector an optimum path is identified through delivery to the next hop along the shortest path and may be based on a modified Bellman-Ford algorithm. A preferred interplanetary backbone network uses either link state or distance vector routing schemes for on-line real time automatic dynamic routing. End-to-end transmission times are minimized and link cost is dramatically reduced. Moreover, the backbone network is dynamically adaptable to network changes and, further, is immune to many network partitions/node failures. Separating nodes may be identified in advance and reconnection (i.e., communications windows) predicted according to orbital motion. Network stability is improved with potential network communications and routing oscillation reduced or even eliminated. Alternate routes are identified with relatively fast convergence in both off-line and on-line real time implementations.

BRIEF DESCRIPTION OF THE DRAWINGS

The foregoing and other objects, aspects and advantages will be better understood from the following detailed description of a preferred embodiment of the disclosure with reference to the drawings, in which:

FIG. 5 illustrates an example of pseudo code for determining shortest path values in time dependent link state routing with each path is taken to have sufficient capacity available that capacity does not hamper transmission.

DETAILED DESCRIPTION

Figure 1A:
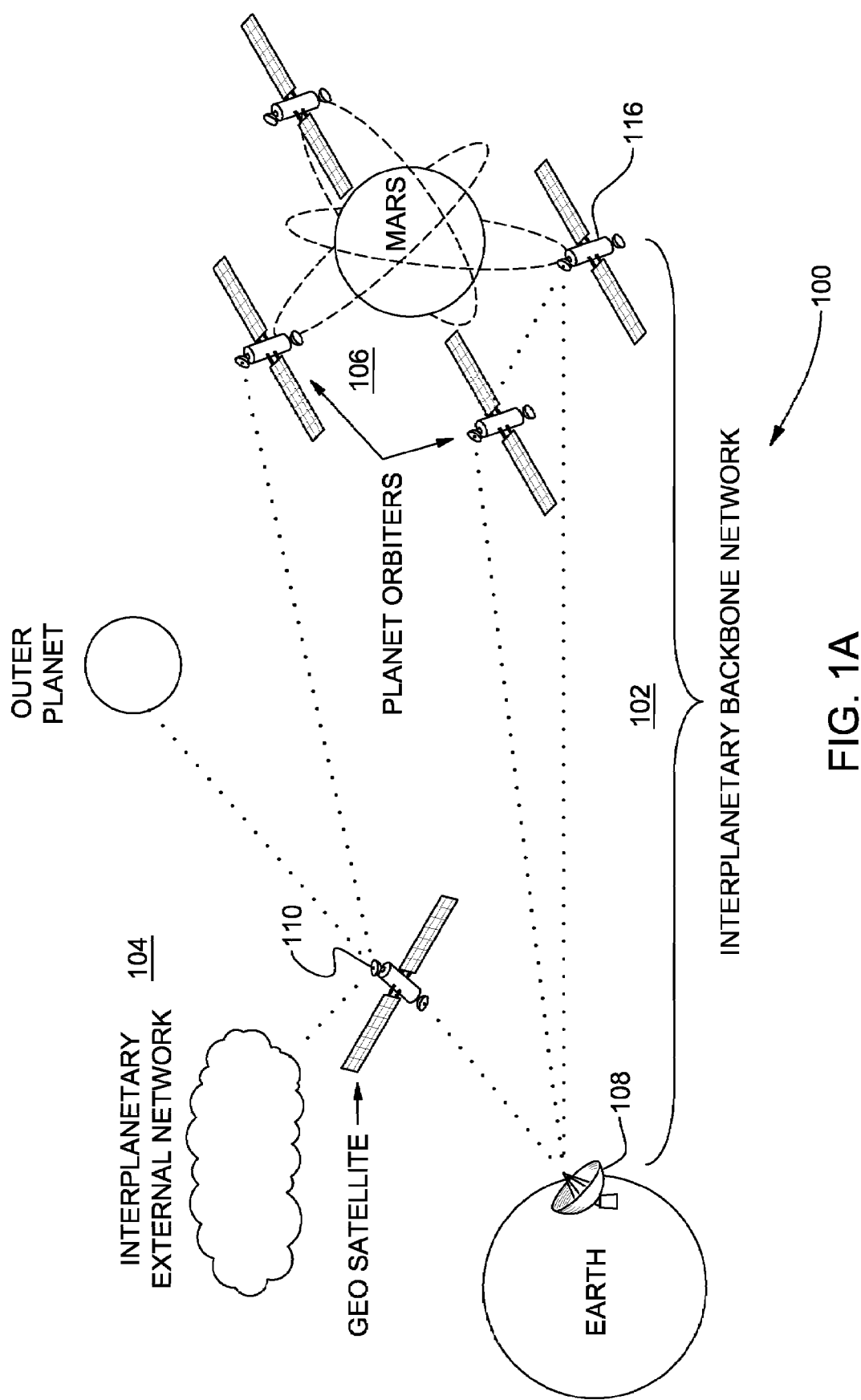
FIGS. 1A-B illustrates an example of a hierarchical interplanetary communications network or Interplanetary Internet, trained off-line for static routing and network planning and for handling gateway selection according to an advantageous embodiment.
Figure 1B:
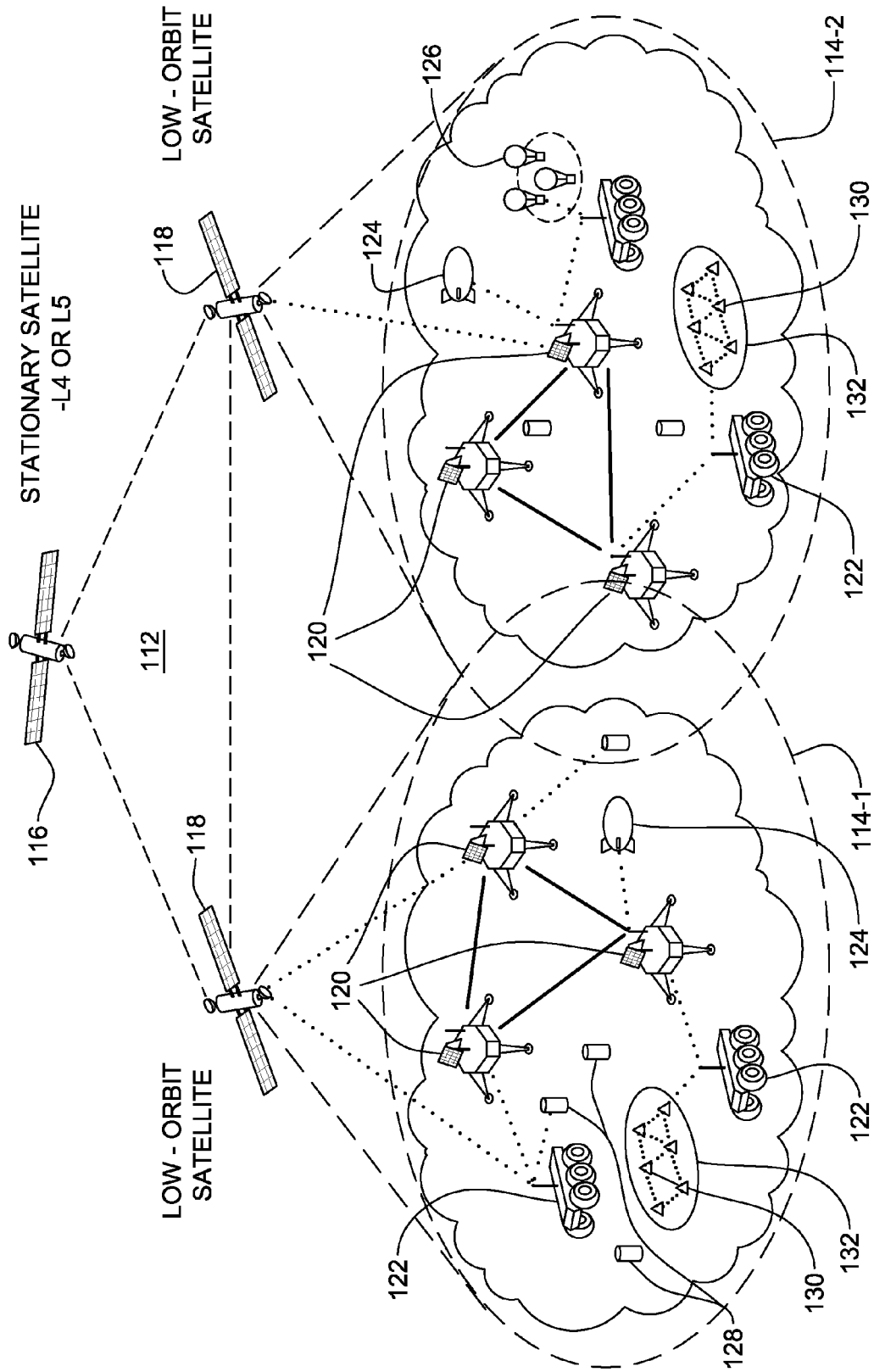

Turning now to the drawings, FIGS. 1A-B illustrate an example of a hierarchical interplanetary communications network 100 or Interplanetary Internet, trained off-line for static routing and network planning according to an advantageous embodiment of the disclosure. In particular, a preferred hierarchical interplanetary communications network 100 is a self-monitoring ad-hoc network of Artificial Neural Network (ANN) nodes. Each ANN may be in the hardware or software in each node. There are several different types of ANN nodes that may be suitable for different types of applications within the network 100. These types include feed-forward ANN nodes that learn with a teacher, recurrent ANN nodes that learn with or without a teacher and self organizing ANN nodes that learn without a teacher. Most frequently, ANNs are implemented in feed-forward nodes that are based on what is normally referred to as a Back Propagation (BP) Algorithm. In general, however, an ANN is relatively robust, simple to train and self-repairing network and ANN nodes adapt and learn from surrounding (dynamically) environmental conditions exhibiting what is known as a universal approximation property.

Preferably based on the universal approximation property of multi-layer perceptron (MLP) neural networks, an ANN can do almost anything a computer does without a priori knowledge of all possible outcomes required in a fixed computer program. Thus, ANNs may have application to any computable or recursive function. Such functions may include, but not limited to for example: tasks that involve prediction/forecasting (e.g., financial forecasting and highway safety tasks); adaptive filtering and system identification tasks (e.g., adaptive equalizers and for speech/image recognition); data mining tasks (e.g., data clustering and fault/failure diagnosis); and, combinatorial optimization tasks (both linear and non-linear). A preferred interplanetary communications network 100 is a hierarchical network of ANN nodes trained to use many of these ANN functions. Preferably, the ANN nodes are trained substantially as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," filed Jul. 22, 2005, assigned to the assignee of the disclosure and incorporated herein by reference.

More particularly, a preferred hierarchical interplanetary communications network 100 is an Adaptive Self Organizing Neural Network (ASONN) of self monitoring artificial neurons. So, the preferred hierarchical interplanetary communications network 100 may include a number of ANN element based communications devices, stations or nodes and is referred to herein as an Interplanetary Communications Neural Network (ICNN). Each ICNN node may monitor other directly connected ICNN nodes to identify and predict disconnections and, expected re-connections. As shown in this example, an ICNN may include space borne, airborne and ground based communications units or stations as ICNN nodes. Preferably the ICNN nodes area hierarchically organized with a primary system or sub-network (interplanetary backbone network 102); an autonomous intermediate system or sub-network (interplanetary external network 104 with nodes having predictable trajectories); and, one or more tertiary systems or sub-networks (e.g., planetary network(s) 106). The autonomous intermediate sub-network and tertiary sub-networks may periodically attach to the interplanetary backbone network 102.

The interplanetary backbone network 102 originates/terminates at one or more fixed earth stations 108 and automatically and dynamically routes communications to gateways in planetary networks 106 according to an advantageous embodiment. Communications routes may be direct or indirect i.e. through intermediate nodes, such as, passing through geostationary (GEO) satellite 110 in the interplanetary external network 104. The interplanetary external network 104 provides shorter-range links through nodes 110 that have predictable trajectories with a time varying attachment to the interplanetary backbone network 102. Nodes 110 in the interplanetary external network 104 may be, for example without limitation, groups of spacecraft in deep space, space craft between planets, sensor node clusters, and groups of space stations.

As shown in more detail in FIG. 1B, the tertiary planetary networks 106 may each include a planetary satellite network 112 and planetary surface networks 114-1, 114-2. The planetary satellite network 112 in this example, includes a planet stationary satellite 116 (equivalent to geostationary or other high-orbit relay satellite) and low orbit satellites 118, analogous to low Earth orbit satellites. Furthermore, these networks or sub-networks 102, 104, 106, 112, 114-1, 114-2 may each operate based on a different protocol. The sub-networks 102, 104, 106, 112, 114-1, 114-2 may use different routing algorithms. Moreover, the sub-networks 102, 104, 106, 112, 114-1, 114-2 may interface with each other through a designated gateway node (e.g., a planet stationary satellite 116) in the particular network or sub-network. So, for example, the planetary satellite network 112 may be based on an high level protocol, while planetary surface networks 114-1, 114-2 may incorporate suitable land mobile wireless ad-hoc routing protocols, modified for energy awareness. A designated gateway planet stationary satellite 116 may be considered part of the interplanetary backbone network 102 for interplanetary communications. Thus, the planet stationary satellite 116 may be located at Lagrangian points ($L_4$ or $L_5$) in the interplanetary backbone network 102 and act as a gateway node for inter-planetary/extraplanetary communications with the particular planetary surface networks 114-1, 114-2. Nodes in the planetary surface networks 114-1, 114-2 may include any suitable land based or low altitude wireless communications capable vehicles. So, for example without limitation, each of the planetary surface networks 114-1, 114-2 may include suitable numbers of lander vehicles 120 providing a local network backbone; terrain based craft or rovers 122; flying nodes such as aircraft 124 (e.g., a piloted and/or drone aircraft) and balloons 126; fixed/deployed probes 128 and/or sensors 128, e.g., a sensor array 130.

In terrestrial-style networks such as planetary surface networks 114-1, 114-2, network latency from propagation delays may be very low and, therefore, might be ignored. Nodes 120-130 in these planetary surface networks 114-1, 114-2 may move erratically and suffer contention from sharing RF channels. Even with high levels of communications overhead, however, there may be hundreds to thousands of nodes 120-130 that provide plentiful capacity for maintaining network connectivity in the planetary surface networks 114-1, 114-2. Accordingly, planetary surface network connectivity may be changing continually due to erratic local node movement. Communications connectivity may be treated within planetary surface networks 114-1, 114-2 as equivalent to a suitable earth-based ad-hoc network. Such a suitable Earth-based ad-hoc network is described in U.S. patent application Ser. No. 11/426,417, entitled "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVITY PREDICTIONS FOR MOBILE AD HOC RADIO NETWORK," U.S. patent application Ser. No. 11/426,425, entitled "NEURAL NETWORK-BASED MOBILITY MANAGEMENT FOR SELF-PARTITION DETECTION AND IDENTIFICATION OF MOBILE AD HOC RADIO NETWORKS," and U.S. patent application Ser. No. 11/426,428, entitled "NEURAL NETWORK-BASED MOBILITY MANAGEMENT FOR HEALING MOBILE AD HOC RADIO NETWORKS," all four filed Jun. 26, 2006, assigned to the assignee of the present application and incorporated herein by reference.

By contrast, the interplanetary backbone network 102 may include a much smaller number of predictably moving nodes, for example without limitation, tens of nodes 110, 116 or even less, e.g., orbiting nodes 116. When connected and/or linked, these backbone nodes 110, 116 form a communication backbone that may be treated, more or less, as dedicated point-to-point links. However, due to node 116 relative movement, e.g., orbital motion, the node 110, 116 links are continually changing with most links occurring only intermittently. Thus, the interplanetary backbone network 102 is dynamic, albeit on a much coarser time scale than planetary systems 106 and continuously self-partitioning and self-healing depending upon node 110, 116 positions. Since some nodes 116 may have only intermittent availability, all data through those nodes 116 must be transferred when the node 116 is available, i.e., during a window of opportunity. This intermittent availability from limited and/or intermittent connectivity reduces communications capacity, making communications scarce in more extreme cases. Moreover, communications between distant nodes 116 on planets (e.g., Mars) or non-planets (e.g., Pluto) may be characterized by large propagation delays, i.e., tens of seconds to tens of minutes or more. Thus, the interplanetary backbone network 102 may require very different routing protocols than land based communications to establish and maintain interplanetary communications. Furthermore, even during a window, when two nodes 110, 116 are linked, unless one linked node 110, 116 can handle the data communications workload required by the other (i.e., the node 110, 116 has sufficient capacity), transferring data over that link may be impractical. Therefore, optimal routing over the interplanetary backbone network 102 requires knowledge of these constraints to make efficient use of total available capacity. So, minimizing packet delays must be balanced with flow control to maximize network throughput, i.e., to assure that little if any offered load is rejected and that all of the data is transferred in minimum time.

Figure 2A:
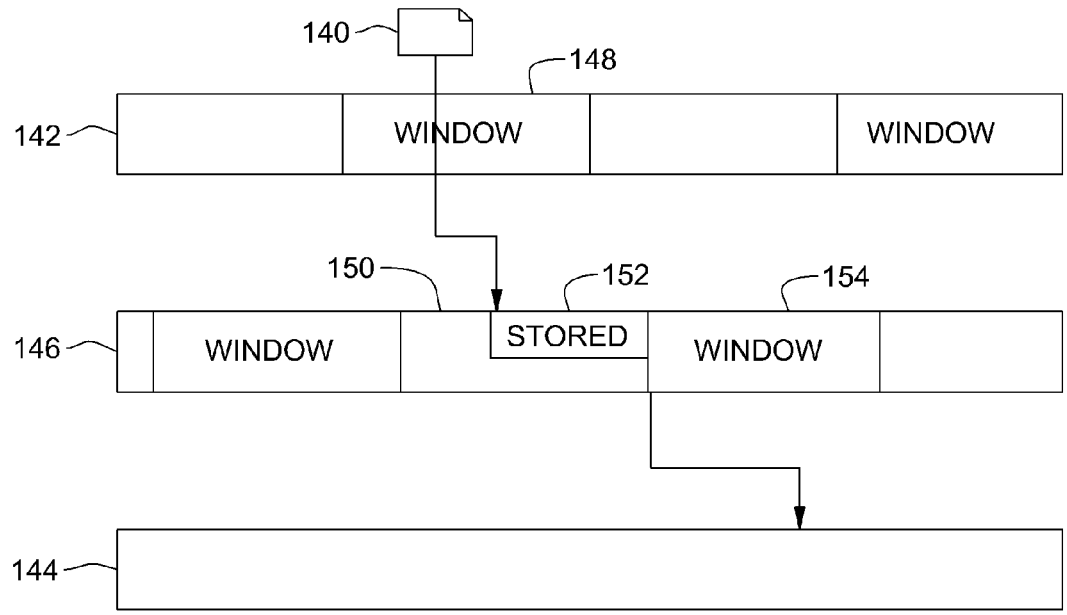
FIGS. 2A-B illustrates examples of end-to-end communications for a data packet arriving at an origination node and being forwarded to a destination node, e.g., earth.
Figure 2B:
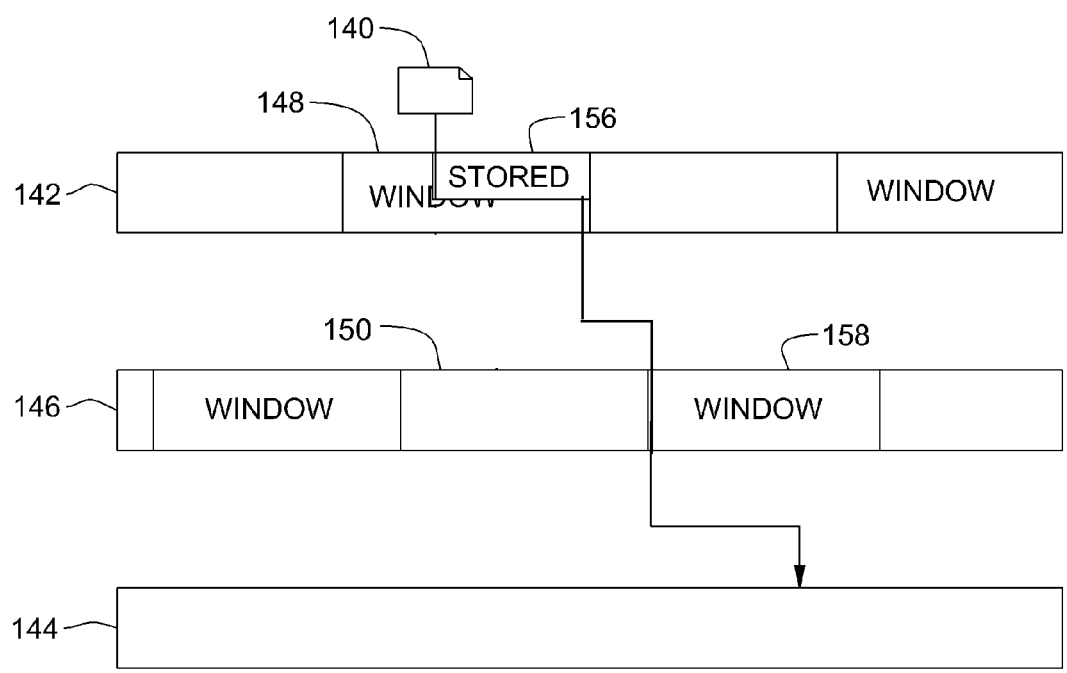

FIGS. 2A-B show examples of end-to-end communications for a data packet 140 arriving at an origination node (e.g., 116 in FIGS. 1A-B) represented by transmission window bar 142 and forwarded to a destination node (e.g., earth node 108) represented by transmission window bar 144. In the first example of FIG. 2A, the origination node immediately passes data to an intermediate node (e.g., node 110) represented by transmission window bar 146. Each transmission window, e.g., 148, is designated as a "WINDOW" and undesignated periods 150 are of no communication or blocked, e.g., from planetary eclipses or propagation conditions between nodes that are too remote.

Earth based network routing has primarily used one of two shortest path algorithms, the Bellman-Ford algorithm and the Dijkstra algorithm. The Bellman-Ford algorithm is used in Border Gateway Protocol (BGP) based on a crude measure of average link utilization to minimize congestion. The Dijkstra algorithm is used with Autonomous Systems (AS) based on Open Shortest Path First (OSPF) link costs with link costs configurable by a network administrator in a static configuration. Unfortunately, using the shortest path as determined, for example, by the minimum number of hops, ignores the intermittent nature of transmission windows and does not account for propagation delays between the nodes or the capacity of intervening nodes or lack thereof. So, while shortest path routing may work for fixed static networks or for ad-hoc land based networks, it fails to provide adequate flow control for a much more widely dispersed network such as the interplanetary backbone network 102 and further, may provide potentially, unstable results and/or oscillations. Additionally, because there may be long periods of time (minutes or hours or days) when an end-to-end connectivity may not exist, traditional routing assumptions are inapplicable to space networks 100.

Space network routes are time-dependent, making their routing metrics more complex than traditional network routing metrics. Similarly performance/routing metrics (e.g., propagation and connectivity) for space networks are time-dependent. Moreover, improper routing does more than just slow communications. Improper routing can cause buffer contention and overflow at intermediate nodes that fail to meet long term storage requirements. This is likely to be a problem especially at distant nodes, where storage is at a premium or on very short supply. Therefore, optimal routing requires complete knowledge of node capacities and of key time-dependent network parameters, such as contact times, orbital parameters, traffic loads, and node queuing delays.

In the example of FIG. 2A, the packet 140 arrives at node 142 during a window to the next node 146. Node 142 immediately forwards the packet to node 146, where the packet arrives after the transmission propagation delay between the nodes 142-146. Unfortunately, the packet arrival occurs when transmission from node 146 to node 148 is blocked 150 and, so, the packet must be stored (designated STORED 152) on node 146 until the next window 154 opens. If, for example, node 146 has insufficient storage, some of the data in the packet 140 may be lost. Also, if another node (not shown) is trying to send data to node 146 (i.e., contention between the two nodes), that other node may or may not be aware that node 146 is occupied and data is lost from that node. Later, when the next window 154 opens, node 146 passes the packet to the destination node 144, where the packet arrives after the transmission propagation delay between the nodes 146-144. It should be noted that although the time scale employed in the entire system 100, interplanetary backbone 102, or tertiary planetary networks 106 may be based in standard earth time units (seconds, minutes, hours, days, months, years and etc.,), any suitable time metric may be used, e.g., the minimum window length.

In the second approach of FIG. 2B, rather than immediately forward the packet 140 to the first available node, node 142 stores 146 the packet locally, waiting for an end-to-end connection, or at least a connection through the next node. An end-to-end connection need not necessarily entail aligned windows, merely that as the packet arrives at one node, a window opens to the next. So, in this example, the packet 140 waits at node 142 until a window 158 opens at another intermediate node 146, e.g., another local gateway satellite with negligible node 142 to node 146 transmission delay and a direct window from node 146 to the destination node 144. When the window 158 opens, the windows align with transmission propagation delay; and, the total end-to-end delay is the local storage time 156 plus transmission propagation delay. So, generally, the packet 140 waits at node 142 through 156, when the intermediate node 146 does not have good link for the next step. This is analogous to waiting to cross all lanes of a 4-lane road until a gap in traffic allows all 4 lanes to be crossed. Generally, this is preferred to crossing two lanes to end up waiting in a narrow median to cross the other two, only to arrive on the other side at about the same time as if one had waited for the gap.

Figure 3:
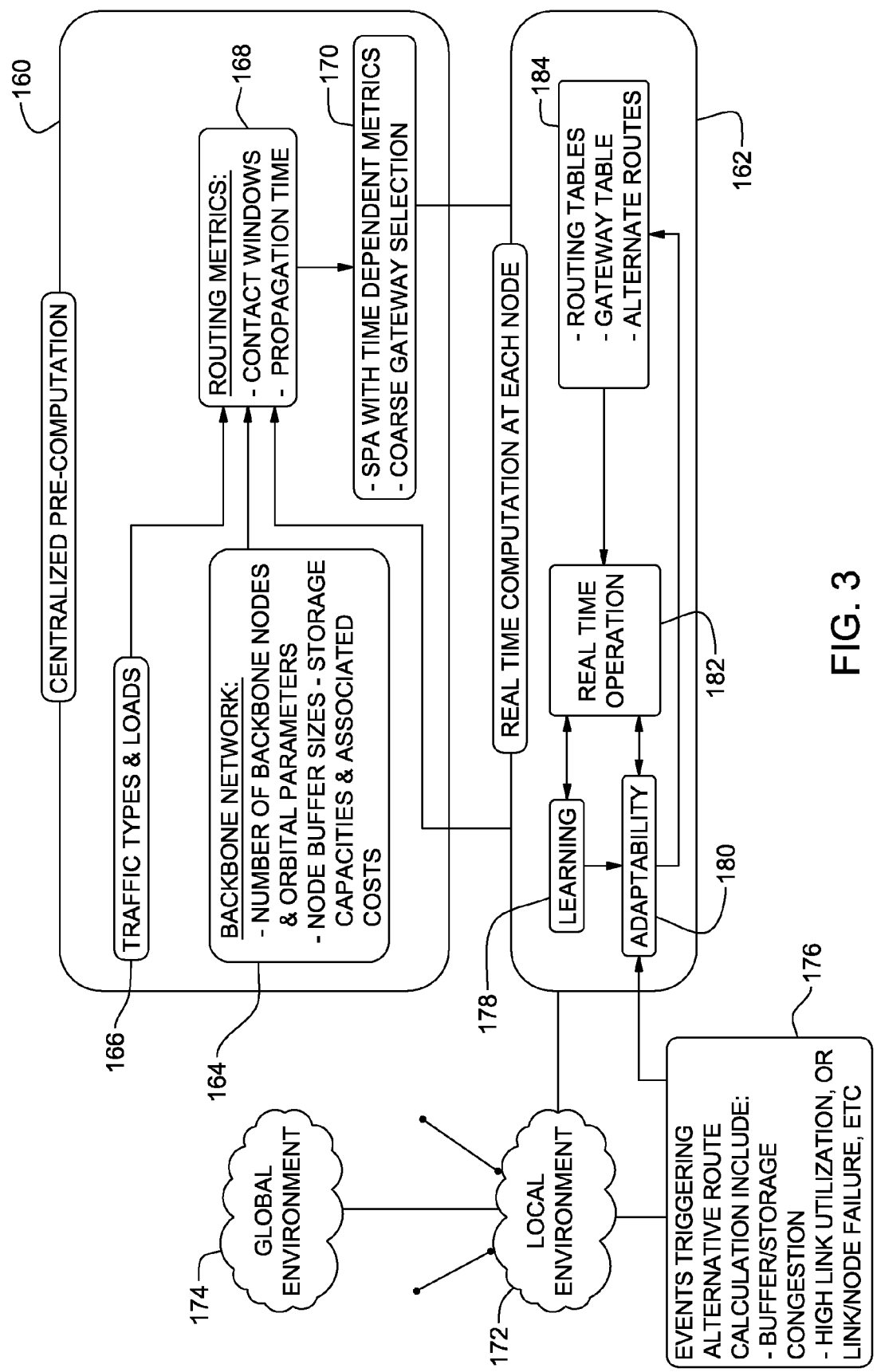
FIG. 3 illustrates an example of cognitive routing for an interplanetary backbone network of ANN nodes.

FIG. 3 shows an example of cognitive routing for minimized end-to-end delays in an interplanetary backbone network (e.g., 102) of ANN nodes according to an advantageous embodiment. In particular, coarse routing from off-line centralized analysis 160 combines in each ANN node with real time distributed analysis 162 to manage the interplanetary backbone network 102 FIG. 1A for optimal end-to-end packet routing to/from all network nodes. Further, results from real time distributed analysis 162 are fed back continually to the off-line centralized analysis 160 to fine tune coarse routing.

Off-line centralized analysis 160 provides cost metric estimations in a centralized pre-computation backbone routing. The backbone routing is based on contact windows derived from a network description 164 (e.g., from coarse orbital parameters and initial node positions) and expected traffic description 166 (e.g., traffic loads and queuing delays), and further based on network time synchronization (i.e., a common view of time) for efficient routing to generate routing metrics 168. The network description 164 includes, for example, the number of nodes in the interplanetary backbone network 102, as well as specific characteristics of each. These specific characteristics may include without limitation orbital parameters, node buffer/storage capacities and associated storage costs. The expected traffic description 166 may include the expected traffic types and data loads. Routing metrics 168 are derived from the network description 164 and the expected traffic description 166. The routing metrics 168 are tuned based on distributed results, i.e., results from real time distributed analysis 162. The routing metrics 168 may include a time varying link description for the entire network, e.g., a window matrix (W(t)). The window matrix for a k node backbone network has the form $$W(t) = \begin{pmatrix} w_1^1(t) & w_1^2(t) & \cdots & w_1^k(t) \\ w_2^1(t) & w_2^2(t) & \cdots & w_2^k(t) \\ \cdots & \cdots & \cdots & \cdots \\ w_k^1(t) & w_k^2(t) & \cdots & w_k^k(t) \end{pmatrix}$$

with each matrix entry, $w_j^i(t)$, being a time varying binary value indicating link windows (i.e., expected intermittent linked time intervals) between pairs of interplanetary backbone network 102 nodes. Since unreachable nodes do not have windows to a current node, only those that are reachable for a particular node, i, are in the neighborhood, $N_i$, of node i. Also, the routing metrics 168 may include a propagation delay matrix ($\Delta(t)$), having the form $$\Delta(t) = \begin{pmatrix} d_1^1(t) & d_1^2(t) & \cdots & d_1^k(t) \\ d_2^1(t) & d_2^2(t) & \cdots & d_2^k(t) \\ \cdots & \cdots & \cdots & \cdots \\ d_k^1(t) & d_k^2(t) & \cdots & d_k^k(t) \end{pmatrix}$$

with each matrix entry, $d_j^i(t)$, indicating link propagation delay between pairs of interplanetary backbone network nodes. Modified Link State Routing—(Modified Dijkstra shortest path algorithms (SPA)) are applied 170 to the routing metrics 168 to provide time-dependent optimum routing path and a coarse gateway selection for the interplanetary backbone network 102.

The real time distributed analysis 162 monitors environmental conditions, both local environment 172 and global (or macro) environment 174, as well as node-switch triggering events 176. The node-switch triggering events 176 may include any event that is expected to trigger turning to an alternative route, for example without limitation data congestion (buffer or storage nearing capacity), a link/node failure and/or heavy link utilization. The nodes combine previously learned behavior 178 to adapt 180 in real time 182 and fine tune 184 the coarse routing input for specific local needs, e.g., providing fine tuned routing tables and gateway tables and offering alternate routes as needed.

Figure 4:
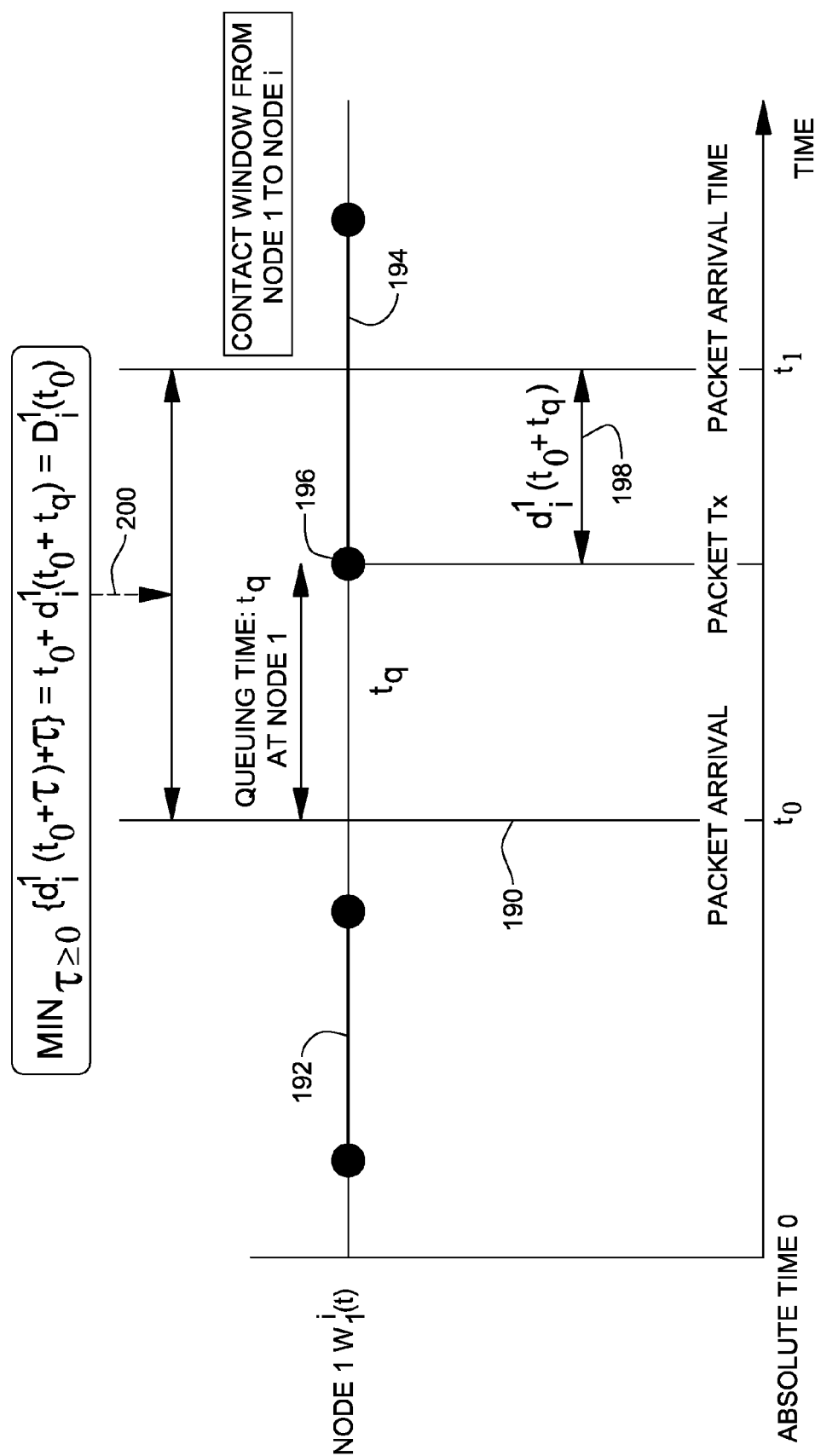
FIG. 4 graphically represents communications timing over a link window.

FIG. 4 illustrates communications timing over a link window with reference to FIG. 3. Off-line centralized analysis (160) begins with neighbor discovery to identify the neighborhood, $N_i$ for each node i. The other ones of the k−1 nodes may be identified as neighbors that can communicate with node i for a specified minimum duration, i.e., beyond a planning horizon T. Typically, the planning horizon T is a long enough time to transfer a data packet. Next, contact window lengths are determined for each node i to every neighboring (i.e., reachable) node. A packet arriving at a node at a given time (to) 190 between windows 192, 194 may be stored/queued locally at the node for some queuing time ($t_q$) 196 until the next contact window 194 occurs. At time ($t_0+t_q$) the packet can depart for the neighboring node in the path. So generally, a packet received at node i at $t_0$ and cached for $t_q$ and arriving at node j after a respective propagation delay $d_j^i(t)$ 198 is given by $(t_0+t_q)+d_j^i(t_0+t_q)=t_0+D_j^i(t_0+t_q)$. The optimum (minimum) path delay occurs at some minimum cache time ($\tau$) that satisfies: $\text{Min}_{\tau \geq 0}\{d_j^i(t_0+\tau)+\tau\}=t_0+d_j^i(t_0+t_q)=D_j^i(t_0)$, and generally, $D_j^i(t)=\min_{\tau \geq 0}\{d_j^i(t_0+\tau)+\tau\}$ with all values of $D_j^i(t)$ being piecewise continuous and finite for all nodes. So, $D_j^i(t)$ 200 provides the minimum time necessary to relay a packet, i.e., an optimized queuing cache time ($\tau$) for minimized propagation delay ($d_j^i(t)$). A shortest path matrix (D(t)) may be generated for the node neighborhood with the form $$D(t) = \begin{pmatrix} D_1^1(t) & D_1^2(t) & \cdots & D_1^k(t) \\ D_2^1(t) & D_2^2(t) & \cdots & D_2^k(t) \\ \cdots & \cdots & \cdots & \cdots \\ D_k^1(t) & D_k^2(t) & \cdots & D_k^k(t) \end{pmatrix}$$

that combines waiting time and propagation delay for traversing each edge (i, j) to guarantee optimally queuing packets for a next contact window opportunity.

FIG. 5 illustrates pseudo code for determining offline, time-dependent link state (modified Dijkstra algorithm) shortest path algorithm using values $D_j^i(t)$ to compute and identify the shortest path 200 according to an advantageous embodiment. In this example, each path is taken to have sufficient available capacity that link capacity does not hamper transmission, i.e., the time dependent link state for shortest path routing. Inputs 202 include a source node (s) and starting time (to); a network graph of the backbone with nodes at graph vertices (V) connected by piecewise continuous links or edges (E(t)) and having the form $G=(V, E(t_0))$; and the matrix D(t). The output 204 (L) is a routing table indicating the cost of the shortest path to all nodes. In step 206 the set of path nodes (P) are initialized (i.e., P is emptied), the delay entry in L for the source node is set to zero and set to infinity (i.e., disconnected) for all other nodes. Then, beginning in step 208 each neighboring node is iteratively selected and added to the path to begin determining the shortest path to all neighboring nodes. In step 210 the minimum route cost delays are iteratively determined from the selected neighboring node to each of the other remaining nodes until the routing table output indicates the cost of the shortest path to all nodes.

Preferably, each node maintains a copy of the routing table (computed offline) and, whenever a node observes a change in link status with other linked nodes, that node broadcasts only the link changes, e.g., utilization, queuing, timing synchronization errors. Thus, instead of each node broadcasting the whole routing table, nodes only broadcast observed changes to link status with other neighboring nodes. Furthermore, each node only receives changes from other nodes. This reduces the data handling requirements and re-computation necessary for all nodes to refresh for indicated changes for other nodes. While the shortest path matrix (D(t)) quantifies transmission delays between any two nodes, those delays may be valid only when the receiving node has capacity to receive/forward the packet, i.e., ignoring the link cost. As described hereinabove, during on-line real time operation, ANN nodes adaptively update link weights/metrics.

Frequently the routing tables are cyclical in nature due to the periodicity of node orbits, i.e., for all i, Table[$T_i$]=Table [$T_i+\eta$] (the same table) for some fixed integer $\eta \geq 1$. The time-dependent routing table will have the form:

(DEST,Delay/Cost,($n_1, \ldots, n_m$))[$T_j$].

Where ($n_1, \ldots, n_m$) is the shortest path from node $n_1$ to node $n_m$.

Figure 6:
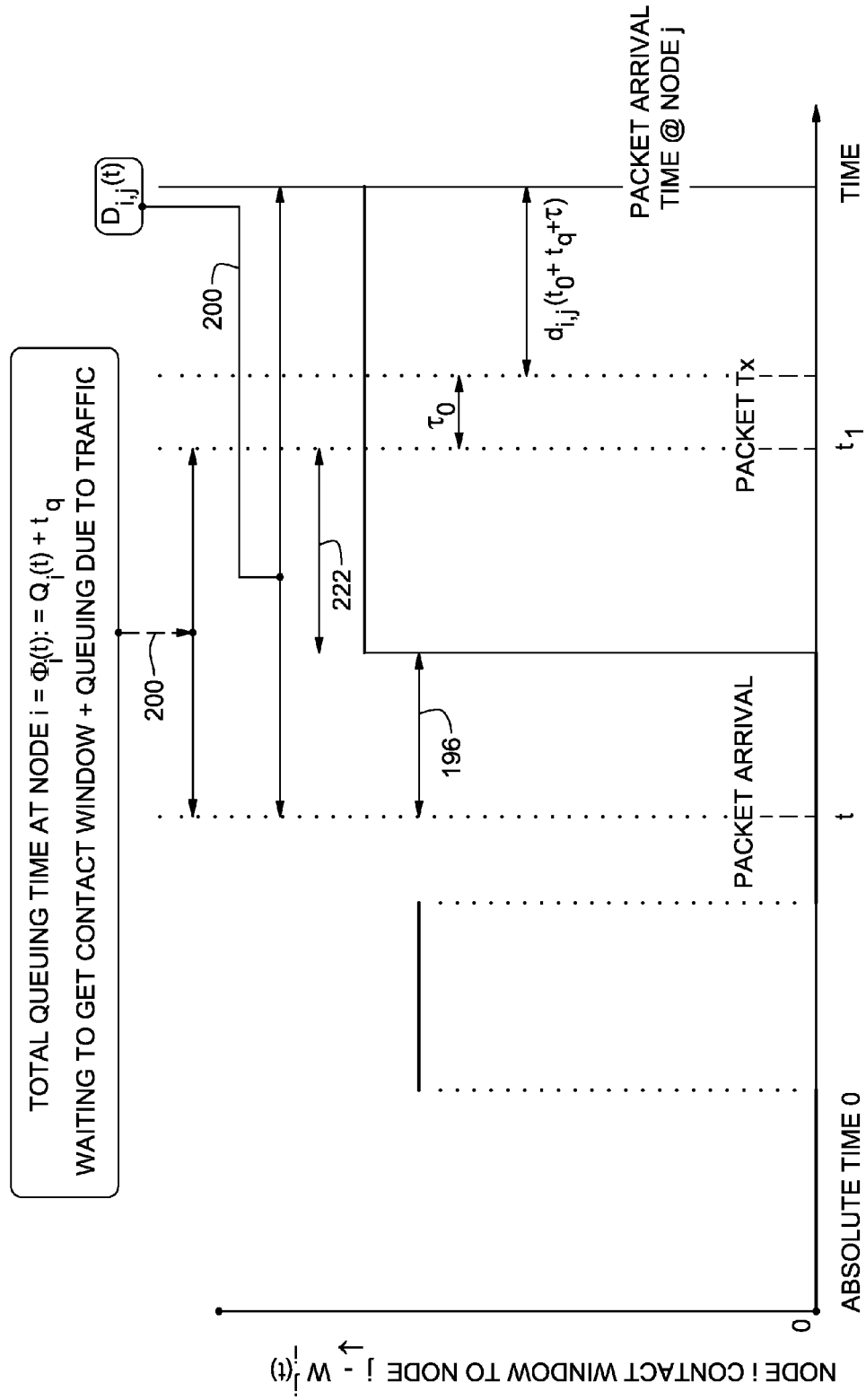
FIG. 6 illustrates an example of generally determining non-zero and time dependent transmission-capacity link cost.

FIG. 6 illustrates an example of time-dependent distance vector hop-by-hop routing of general determination of individual link cost ($l_j^i(t)$), that is non-zero (e.g., in bits per unit time) and time dependent, with reference to FIG. 4 and with like elements labeled identically. Table 1 below, shows an example of variables that may be used in hop-by hop routing with corresponding definitions. More particularly, this example shows the application of Bellman optimality equations to time dependent interplanetary networks and for hop-by-hop routing.

mined for each neighboring node by balancing the delay for waiting for an optimum window against waiting for optimum path cost.

In a quick and simple optimization using the Bellman optimality equations, e.g., an off-line coarse optimization in each node, storage costs ($C_i$) and individual link costs ($l_j^i(t)$) are taken to be identical and constant for all nodes, i.e., $C_i$=Constant, j=1, 2, . . . k; and $l_j^i(t)$)=Constant for all t. Further, queuing traffic due to loads is taken to be negligible (i.e. $Q_i(t) \sim 0$). Then, recursive analysis is applied be using state of the art dynamic programming methods to solve Bellman optimality equations: $\pi_i(t)$=Min[$t_q+\pi_i(t_q)$]; min {$D_j^i(t)+\pi_i(D_j^i(t))$}], $\pi_d$=0 (i.e., optimum path to node d to itself is zero), where $t_q+\pi_i(t_q)$ is the result of only waiting at node i to get first contact window to node to j; and {$D_j^i(t)+\pi_i(D_j^i(t))$} provides an optimal wait at node i, i.e., recursively solved can and is based on a.

Table 2 shows an example of a hop-by-hop routing table maintained at each node; For M network nodes, there are a total of M−1 such tables at each network node. Each routing table is am array indexed by discrete time intervals, $T_0, \ldots T_i$. The time intervals are formed by dividing the time horizon into sufficiently small intervals: [$T_i$, $T_i+1$], i=1, 2, . . . L. Preferably the time intervals are small enough to fix the propagation delay within each time horizon interval.

TABLE 2

| Time-cyclic | One Table per destination node | | |
|---|---|---|---|
| | TIME | COST/DELAY | NEXT-HOP |
| ↑↓ | $T_1$ | P(1) | Node-1 |
| ↑↓ | $T_2$ | P(2) | Node-2 |
| ↑↓ | : | : | : |
| ↑↓ | : | : | : |
| ⌣ | $T_K$ | P(k) | Node-k |

TABLE 1

| | |
|---|---|
| $C_i$: | Storage/Buffering cost of a packet (or data unit) at node i per unit time |
| $Q_i(t)$: | Queuing time, at time t at node i, excluding waiting time to get a window transmission opportunity to node j. |
| $U_{ij}(t)$: | Link utilization (between nodes (i, j)) {Note that $Q_i(t) \sim 1/(1 - U_{ij}(t))$} |
| $t_q$: | Waiting time to get first transmission opportunity to node j at time t (this is a function of node location at lime t), $t_q \geq 0$. |
| $\Phi_i(t)$: | =$t_q + Q_i(t)$; {$\Phi_i(t) \sim t_q + 1/(1 - U_{ij}(t))$} |
| $N_i$: | The set of neighboring nodes of node i. |
| $l_{ij}(t)$: | cost of link between nodes (i, j) at time - link cost might be bit rate; generally time dependent. |
| $\pi_i(t)$: | Minimum/Shortest Path Cost from node i to destination node d at time t. |
| $D_{ij}(t)$: | Minimum/Optimum Waiting Time at Local Node i to transmit to neighboring node j. |
| $\tau_0$: | the value that optimizes $D_{ij}(t)$: Min$_{\tau \geq 0}$ {$d_{ij}(t + \tau) + \tau$} = $t + d_{ij}(t + t_q) = D_{ij}(t)$ |

Each node, i, has a time dependent capacity queuing time ($Q_i(t)$) 220 that is independent of the time that packets are cached for a transmission window. Further, links from one node, i, to another, j, have utilization rate ($U_j^i(t)$) that is roughly inversely related to this queuing time, i.e., $Q_i(t) \sim (1-U_j^i(t))^{-1}$. So, a packet arriving at node, i, pauses for a total queuing time ($\Phi_i(t)$) 222 that is defined by the sum of the capacity queuing time ($Q_i(t)$) 220 and the window queuing time ($t_q$) 196. So, more specifically, $\Phi_i(t):=t_q+Q_i(t); \Phi_i(t) \sim t_q+(1-U_j^i(t))^{-1}$. From this, a time dependent minimum/shortest path cost ($\pi_i(t)$) may be deter- Frequently the routing tables, such as shown in the example of Table 2, are cyclical in nature due to the periodicity of node orbits, i.e., for all i, Table[$T_i$]=Table [$T_i+\eta$] (the same table) for some fixed integer $\eta \geq 1$. Next hop nodes for the shortest route between two nodes, $n_1$ and $n_m$, selected by link state determined by:

(DEST,Delay/Cost,next-hop)[$T_j$].

This simple optimization may be determined independently by each node, where routing tables may be updated and, the result may also be used for coping with operational link/node failures. Normally, on-line training is conducted before the nodes are launched into space and in space training is off-line. Furthermore, much of the training can be done in a mainframe operating as an ANN, uploaded to a particular node and loaded with a reboot, for example. Also, traffic primarily flowing to and from Earth may present a special case with time windows that are different for inbound and outbound traffic. Inbound and outbound can then be separately scheduled and configured to reduce computational complexity.

Further, a more rigorous optimization that is not deterministic may be derived in a general form of the path optimization relationship, with values determined on-line in recursive analysis during routing convergence analysis. This generalized relationship of this more rigorous optimization has the form, $\pi_i(t) = \text{Min}[\Phi_i(t)C_i + \pi_i(\Phi_i(t)); \min\{(l_j^i + (\Phi_i(t) + \tau)C_i + \pi_i(D_j^i(t))\}]$, where $\Phi_i(t)C_i + \pi_i(\Phi_i(t))$ is the result of waiting at node i to get a first contact window to node to j; and extended by queuing time added due to traffic load; and $\{(l_j^i + (\Phi_i(t) + \tau)C_i + \pi_i(D_j^i(t))\}$ provides an optimal wait at node i. For a discrete representation, rather than based on earth time units as described above, the time horizon is divided into sufficiently small intervals $([T_h, T_{h+1}]$ for $h=1, 2, \ldots, H)$, and t belongs to $[T_i, T_{i+1}]$. Preferably, the length of the time interval is selected according to node orbital parameters. It should be noted that $\pi_i(t)$ is always based on historic data and, therefore, may always be out of date with respect to actual current traffic and delays. However, this may be mitigated through adequately training ANN nodes to forecast/predict expected traffic for any future time. These forecasts/predictions estimate $\pi_j(D_j^i(t))$ as well as link utilization/traffic load at time $D_j^i(t)$ for all neighboring nodes, i.e., $\Phi_j(D_j^i(t))$ and $U_j^i(D_j^i(t))$ for all nodes in neighborhood $N_i$.

Figure 7A:
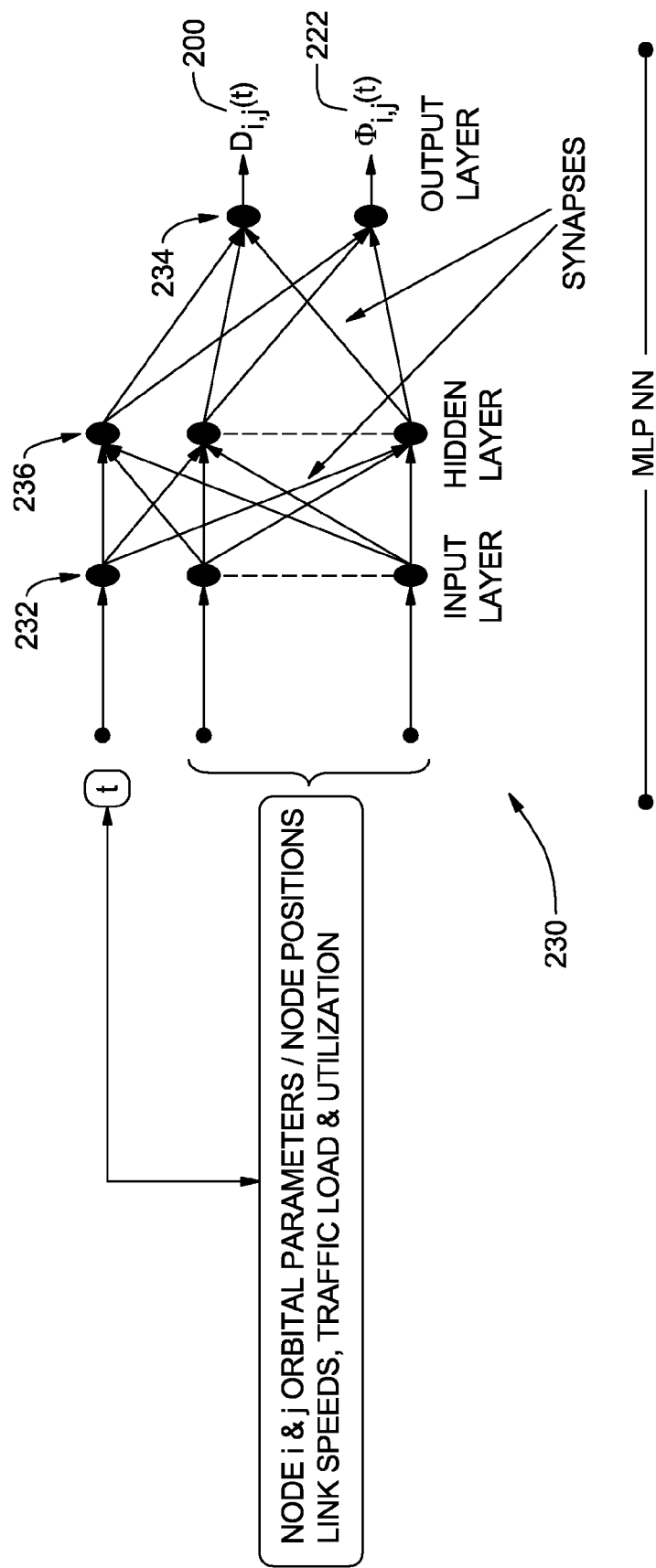
FIG. 7A illustrates an example of generalized-relationship multi-layer perceptron (MLP) neural network analysis for path on-line delay optimization weight/metric estimation that may be used in computing optimal or shortest path, for both time dependent link state routing and time dependent hop-by-hop distance vector optimization.

FIG. 7A illustrates an example of a MLP ANN for path on-line delay optimization of the generalized Bellman optimality relationship for $\pi_i(t)$, according to an advantageous embodiment. This MLP neural net 230 example includes an input layer 232, an output layer 234 and a hidden intermediate layer 236. Time varying originating and destination orbital parameters and node positions are provided to the input layer 232. ANN nodes in the hidden layer 236 have a monotonically increasing nonlinear transfer function. Provided there are a sufficient number of hidden nodes in the hidden layer 236, the MLP neural net 230 filters input estimation errors such that the hidden layer 236 through the universal approximation property of ANN nodes can approximate any arbitrary (nonlinear) function to a desired degree of accuracy. Alternately, ANN nodes can process the universal approximation property through what is known as the radial basis function (RBF). Thus, in this example, the output layer 234 provides improved estimates for total queuing time $\Phi_j^i(t)$ 222 and shortest path matrix $D_j^i(t)$ 200 by filtering the inputs through the universal approximation property of ANN nodes in the hidden layer 236.

Figure 7B:
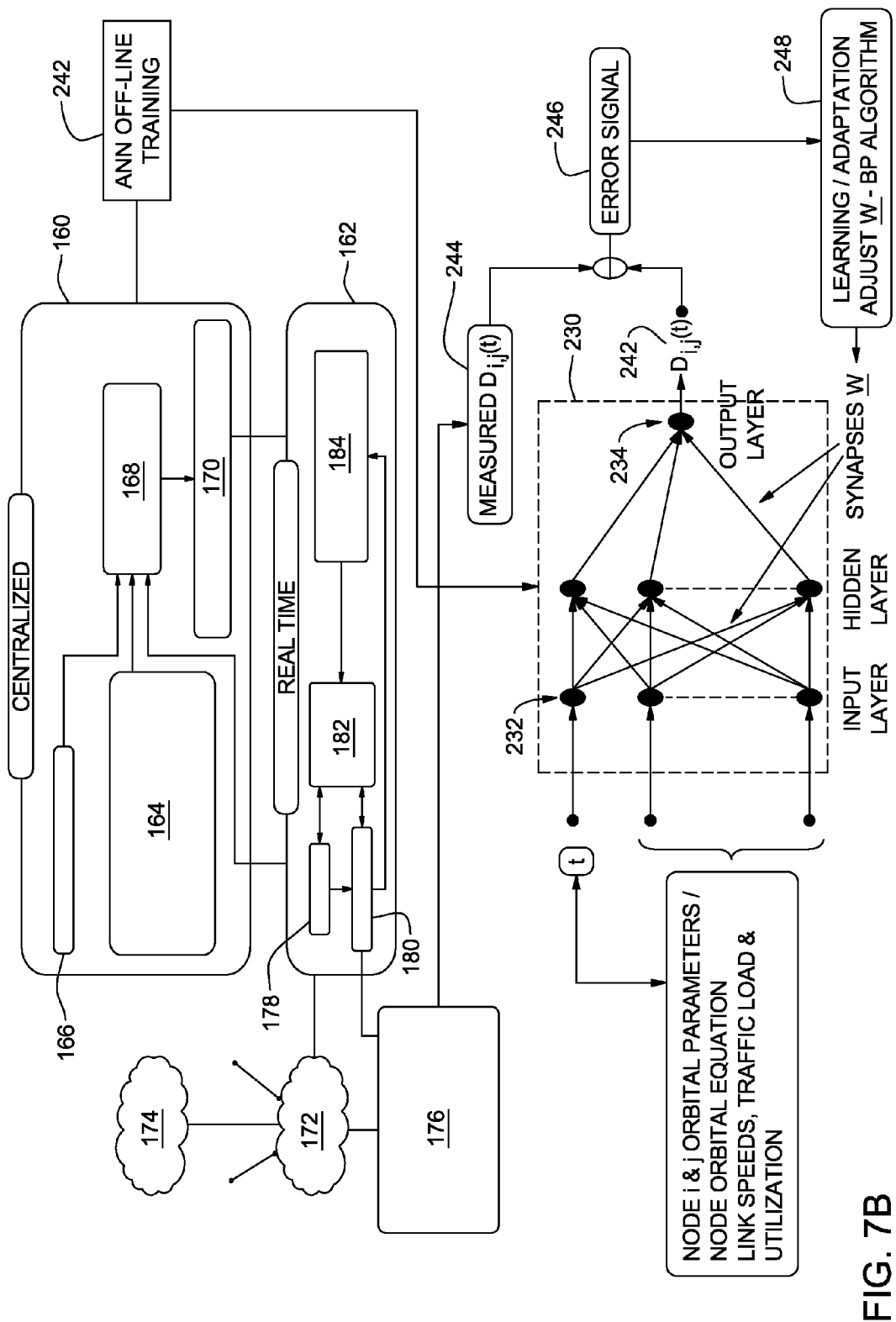
FIG. 7B illustrates an example of real-time training with cognitive routing for the interplanetary backbone network.

FIG. 7B illustrates an example of real-time training for the MLP neural net 230 of FIG. 7A with cognitive routing for the interplanetary backbone network according to FIG. 3. The off-line centralized analysis 160 provides coarse routing in ANN off-line training 242 to the MLP neural net 230. Based on that ANN off-line training 240 the MLP neural net 230 predicts the matrix $D_j^i(t)$ 242 from a node (i) in the input layer 232 to a node (j) in the output layer 234. A measured matrix $D_j^i(t)$ 244, collected with node-switch triggering events 176, is provided for comparison against the predicted matrix $D_j^i(t)$ 242 to generate an error signal 246 indicating the difference between the predicted and measured values 242, 244. Based on this error signal 246 the MLP neural net 230 adjusts the waiting times and other values in the matrix $D_j^i(t)$ transfer function for each node, learning and adapting 248 to reduce/eliminate error signal 246.

Thus, each node includes a link path table for each destination node in a cyclic set of tables/entries of 3-tuples, i.e., $(T_i, \text{Delay}_i/\text{Cost}_i, \text{Next Hop}_i)$, $i=1, 2 \ldots k-1$, as shown in Table 2 hereinabove. These routing tables, many cases, are cyclic in nature due to the periodicity of network node orbits.

Preferably, each node continuously runs a link metric prediction algorithm or, alternately, the link metric prediction algorithm may be run at discrete time intervals. Whenever the error signal exceeds a pre-selected threshold, the values may be automatically updated to improve predicted/estimated routes to all potential destinations, i.e., for a smaller cost/delay to neighboring nodes. Thereafter, existing routes are continually refreshed and, any that fail to refresh (e.g., time out) may be deleted. Although this example is shown for matrix $D_j^i(t)$ prediction analysis and tuning, this same example of FIG. 7B may be used for predicting total queuing time $\Phi_j^i(t)$ and path times $\pi_i(D_j^i(t))$ and $\pi_i(\Phi_j^i(t))$ as well as predicting utilization rate $(U_j^i(t))$. It should be noted that because the prediction time span is on the order of the network diameter (i.e., the distance between the two most distant connected or end-to-end nodes) predicted value accuracy may be low.

Occasionally, sending nodes may detect link or node failures because, for example, a neighbor node has moved too far away or lost power. Such an occurrence may be noticed, for example, when unicast transmissions fail (i.e., transport layer failures) or when some predefined time out period expires without an expected "hello" return message. Such a link/node failure may open a path from the sending node, making one or more destinations unreachable for some period of time. When the sending node has other next hop alternatives to the same destination, the sending node just updates its routing table and sends a notification of the update to its neighbors. If, however, the only path from the sending node to the destination was through the failed link/node, the network has been unexpectedly partitioned and no path is available to the destination. If the network has a central network management system (NMS) that is equipped to detect partitions, then the sending node must hold the data for some period of time for the central NMS to repair the faulty link/node. Otherwise, when a link or node failure occurs, for example, some other approach is required to route packets.

If accurate cost metric/weight estimates/predictions are unavailable, then agent-based or neurodynamic programming-based routing may be used. Agent-based routing uses on-line network observations and does not require a complete network model, e.g., a priori knowledge of link costs, node capacities, or traffic demands. Further, agent-based routing operates somewhat independently of a single centralized controller and has the capacity to adapt autonomously to changes in network parameters and traffic demands.

Figure 8:
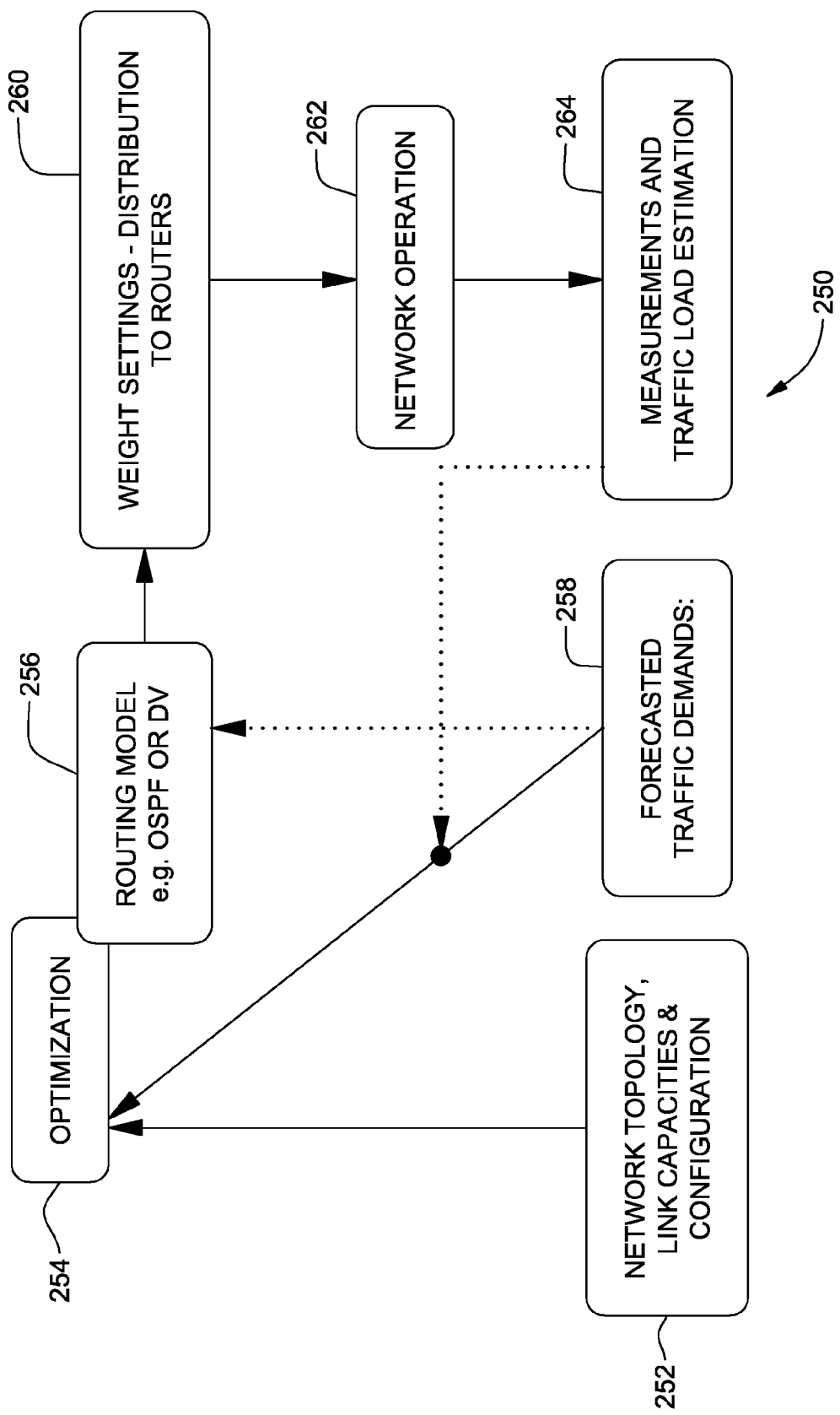
FIG. 8 illustrates an example of traffic engineering framework for the hierarchical interplanetary communications network.

FIG. 8 illustrates an example of traffic engineering framework 250 for optimizing traffic in a hierarchical interplanetary communications network (e.g., 100 of FIGS. 1A-B) according to an advantageous embodiment. A description 252 of the backbone network is provided for optimization 254 of a routing model 256, e.g., using an implementation of time-dependent link state or a time-dependent distance vector (DV) as described hereinabove. Traffic demand forecasts 258 are also provided to optimization 254 and the routing model 256. The routing model 256 generates weight settings and distribution 260 that are passed to network routers for network operation 262. During network operation 262 the network measures 264 traffic loads, network delays and any other relevant parameters, which are passed on to network nodes for off-line analysis and management.

Advantageously, a backbone network in a preferred interplanetary communications network provides robust end-to-end network routing. A preferred interplanetary backbone network uses link state and distance vector routing for on-line automatic dynamic routing. End-to-end transmission times may be minimized and link cost might be dramatically reduced. Moreover, the backbone network is dynamically adaptable to network changes and, further, may be immune to many network partitions/node failures. Separating nodes may be identified in advance and reconnection (i.e., communications windows) predicted according to orbital motion. Network stability is improved with potential network communications oscillation reduced. Alternate routes may be identified with relatively fast convergence in both off-line and on-line implementations.

While the embodiments of the disclosure have has been described in terms of preferred embodiments, those skilled in the art will recognize that the embodiments can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of managing an interplanetary communications network, said method comprising the steps of:
    a) providing a backbone network configuration, said backbone network configuration having a plurality (k) of nodes;
    b) determining transmission propagation times from each node to every other of said plurality of nodes;
    c) determining connection windows from said each node to every other node of said plurality of nodes; and
    d) determining an optimum transmission time in each said connection window to a respective one of said plurality of nodes.

2. A method as in claim 1, wherein the step (c) of determining connection windows identifies re-occurring windows to one or more of said plurality of nodes.

3. A method as in claim 2, wherein the step (c) of determining connection windows provides a window matrix indicating windows occurring between said each node and said every other node and has the form $$W(t) = \begin{pmatrix} w_1^1(t) & w_1^2(t) & \wedge & w_1^k(t) \\ w_2^1(t) & w_2^2(t) & \wedge & w_2^k(t) \\ \wedge & \wedge & \wedge & \wedge \\ w_k^1(t) & w_k^2(t) & \wedge & w_k^k(t) \end{pmatrix}.$$

4. A method as in claim 3, wherein matrix entries, $w_j^i(t)$, comprise time varying binary values indicating linked periods from node i to each of the other (k−1) nodes j and only entries in row i with said time varying binary values are in a neighborhood of node i.

5. A method as in claim 3, wherein the transmission propagation times determined in step (b) are time varying.

6. A method as in claim 5, wherein the step (b) of determining transmission propagation times provides a propagation delay matrix indicating time varying propagation delays between said each node and said every other node and has the form $$\Delta(t) = \begin{pmatrix} d_1^1(t) & d_1^2(t) & \wedge & d_1^k(t) \\ d_2^1(t) & d_2^2(t) & \wedge & d_2^k(t) \\ \wedge & \wedge & \wedge & \wedge \\ d_k^1(t) & d_k^2(t) & \wedge & d_k^k(t) \end{pmatrix}.$$

7. A method as in claim 6, wherein the step (d) of determining optimum transmission times comprises generating a matrix having the form $$D(t) = \begin{pmatrix} D_1^1(t) & D_1^2(t) & \wedge & D_1^k(t) \\ D_2^1(t) & D_2^2(t) & \wedge & D_2^k(t) \\ \wedge & \wedge & \wedge & \wedge \\ D_k^1(t) & D_k^2(t) & \wedge & D_k^k(t) \end{pmatrix}.$$

8. A method as in claim 7, wherein the step (d) of determining optimum transmission times further comprises determining a storage time ($\tau$) above a minimum queuing time ($t_q$) for storing a packet arriving at said first node at a given arrival time ($t_0$) in said each window until said packet is forwarded to said respective one.

9. A method as in claim 8, wherein entries, $D_j^i(t)$, in the matrix satisfy:

$$\text{Min}_{\tau \geq 0}\{d_j^i(t_0+\tau)+\tau\}=t_0+d_j^i(t_0+t_q)=D_j^i(t_0).$$

10. A method as in claim 9, wherein all values of $D_j^i(t)$ are piecewise continuous and finite for all nodes and $D_j^i(t) = \min_{\tau \geq 0}\{d_j^i(t_0+\tau)+\tau\}$.

11. A method as in claim 8, before the step (d) of determining optimum transmission times, said method further comprising determining a time dependent minimum/shortest path cost ($\pi_i(t)$) from each node i to each other node j.

12. A method as in claim 11, wherein determining said time dependent minimum/shortest path cost comprises recursively analyzing $\pi_i(t)=\text{Min}[t_q+\pi_i(t_q); \min\{D_j^i(t)+\pi_i(D_j^i(t))\}]$.

13. A method as in claim 12, wherein $t_q+\pi_i(t_q)$ is the result of only waiting at node i to get first contact window to node to j; and $\{D_j^i(t)+\pi_i(D_j^i(t))\}$ provides an optimal wait time at node i.

14. A method as in claim 11, further comprising determining storage costs ($C_i$) for each node i, a link cost ($l_j^i(t)$) for each node j linked to i, a link utilization rate $U_j^i(t)$ and a corresponding node capacity $Q_i(t)$.

15. A method as in claim 14, further comprising determining total queuing time ($\Phi_i(t)$) for each node i, where $\Phi_i(t): =t_q+Q_i(t)$.

16. A method as in claim 15, wherein determining said time dependent minimum/shortest path cost comprises recursively analyzing $\pi_i(t)=\text{Min}[\Phi_i(t)C_i+\pi_i(\Phi_i(t)); \min\{(l_j^i+(\Phi_i(t)+\tau)C_i+\pi_i(D_j^i(t))\}]$.

17. A method as in claim 16, wherein $\Phi_i(t)C_i+\pi_i(\Phi_i(t))$ is the result of waiting at node i to get first contact window to node to j extended by traffic load queuing time; and $\{(l_j^i+(\Phi_i(t)+\tau)C_i+\pi_i(D_j^i(t))\}$ provides an optimal wait time at node i.

18. A method as in claim 16, wherein multi-layer perceptron (MLP) ANN analysis is used for recursively analyzing $\pi_i(t)$.

19. A method as in claim 18, wherein a result from said MLP ANN analysis is compared with a measured delay and an error signal from comparing said measured delay is fed back to adapt said MLP ANN analysis.

20. A method as in claim 18, wherein each node i includes a link path table for each destination node j.

21. A method as in claim 20, wherein said link path table is in a cyclic 3-tuple set.

22. A method as in claim 7, wherein the complete shortest path and the associated costs between a given node and all other nodes in the network is determined from D(t) at a selected time.

23. A method as in claim 2, wherein the re-occurring windows reoccur periodically to one or more of said plurality of nodes and ones of said plurality of nodes receiving a majority of communications from Earth nodes having a separate schedule and configuration for sending communications to Earth and for receiving communications from Earth.

24. A method as in claim 1, wherein whenever one of said plurality of nodes determines a neighboring node is unresponsive, said node uses agent based routing to reroute paths around said unresponsive neighboring node.

25. An Artificial Neural Network (ANN) node for a backbone network in an interplanetary communications network, said backbone network including a plurality (k) of nodes, said ANN node comprising:

routing metrics means for providing:

a window matrix indicating re-occurring communications windows between each node and each other of said plurality of nodes, and a propagation delay matrix indicating time varying transmission propagation times from each node to said each other of said plurality of nodes; and means for determining an optimum transmission time in each window to a respective one of said plurality of nodes.

26. An ANN node as in claim 25, wherein said window matrix is provided as a k by k matrix with one row for each one of said plurality of nodes, each entry, $w_j^i(t)$, in each row indicating communications windows from a corresponding node i to each node j of the other (k−1) nodes in said backbone network, said window matrix provided having the form $$W(t) = \begin{pmatrix} w_1^1(t) & w_1^2(t) & \wedge & w_1^k(t) \\ w_2^1(t) & w_2^2(t) & \wedge & w_2^k(t) \\ \wedge & \wedge & \wedge & \wedge \\ w_k^1(t) & w_k^2(t) & \wedge & w_k^k(t) \end{pmatrix}.$$

27. An ANN node as in claim 26, wherein each window matrix entry comprises a time varying binary value indicating linked periods and only entries in row i with said time varying binary values are in a neighborhood Ni of node i.

28. An ANN node as in claim 27, wherein the propagation delay matrix is provided as having the form $$\Delta(t) = \begin{pmatrix} d_1^1(t) & d_1^2(t) & \wedge & d_1^k(t) \\ d_2^1(t) & d_2^2(t) & \wedge & d_2^k(t) \\ \wedge & \wedge & \wedge & \wedge \\ d_k^1(t) & d_k^2(t) & \wedge & d_k^k(t) \end{pmatrix}.$$

29. An ANN node as in claim 28, wherein the means for determining optimum transmission times comprises generating a matrix having the form $$D(t) = \begin{pmatrix} D_1^1(t) & D_1^2(t) & \wedge & D_1^k(t) \\ D_2^1(t) & D_2^2(t) & \wedge & D_2^k(t) \\ \wedge & \wedge & \wedge & \wedge \\ D_k^1(t) & D_k^2(t) & \wedge & D_k^k(t) \end{pmatrix}.$$

30. An ANN node as in claim 29, wherein said means for determining optimum transmission times comprises means for determining a storage time (τ) above a minimum queuing time ($t_q$) for storing a packet arriving in said each window at said node i at a given arrival time ($t_0$) until said packet is forwarded to said respective node j.

31. An ANN node as in claim 30, wherein said means for determining optimum transmission times determines matrix entries, $D_j^i(t)$, according to the relationship $\text{Min}_{\tau \geq 0}\{d_j^i(t_0+\tau)+\tau\}=t_0+d_j^i(t_0+t_q)=D_j^i(t_0)$.

32. An ANN node as in claim 31, wherein all values of $D_j^i(t)$ are piecewise continuous and finite for all nodes and $D_j^i(t)=\min_{\tau \geq 0}\{d_j^i(t_0+\tau)+\tau\}$.

33. An ANN node as in claim 30, further comprising means for determining a time dependent minimum/shortest path cost ($\pi_i(t)$) from each node i to each neighboring node j.

34. An ANN node as in claim 33, wherein said means for determining said time dependent minimum/shortest path cost recursively analyzes $$\pi_i(t)=\text{Min}[t_q+\pi_i(t_q); \min\{D_j^i(t)+\pi_i(D_j^i(t))\}],$$

wherein $t_q+\pi_i(t_q)$ is the result of only waiting at node i to get first contact window to node to j; and $\{D_j^i(t)+\pi_i(D_j^i(t))\}$ provides an optimal wait time at node i.

35. An ANN node as in claim 33, wherein said means for determining said time dependent minimum/shortest path cost further determines storage costs ($C_i$) for each node i, a link cost ($l_j^i(t)$) for each node j linked to i, a link utilization rate $U_j^i(t)$ and a corresponding node capacity $Q_i(t)$.

36. An ANN node as in claim 35, further comprising means for determining total queuing time ($\Phi_i(t)$) for each node i, where $\Phi_i(t):=t_q+Q_i(t)$.

37. An ANN node as in claim 36, wherein said means for determining said time dependent minimum/shortest path cost recursively analyzes $$\pi_i(t)=\text{Min}[\Phi_i(t)C_i+\pi_i(\Phi_i(t)); \min\{(l_j^i(t)+\tau)C_i+\pi_i(D_j^i(t))\}],$$

wherein $\Phi_i(t)C_i+\pi_i(\Phi_i(t))$ is the result of waiting at node i to get first contact window to node to j extended by traffic load queuing time; and $\{(l_j^i+(\Phi_i(t)+\tau)C_i+\pi_i(D_j^i(t))\}$ provides an optimal wait time at node i.

38. An interplanetary communications network, said interplanetary communications network having a backbone network comprising k ANN nodes as in claim 37.

39. An interplanetary communications network as in claim 38, further comprising means for recursively applying multi-layer perceptron (MLP) ANN analysis to $\pi_i(t)$.

40. An interplanetary communications network as in claim 39, further comprising means for comparing a result from said MLP ANN analysis with a measured delay, said means for comparing generating an error signal responsive to a difference between said measured delay and said result.

41. An ANN node as in claim 25, wherein ones of said re-occurring communications windows reoccur periodically and said ANN node further comprises agent based routing means for rerouting paths around an unresponsive neighboring said node.

42. A method of managing a backbone network of an interplanetary communications network, said method comprising the steps of:
   a) providing a backbone network configuration, said backbone network configuration having a plurality of nodes;
   b) determining transmission propagation times from each node to every other of said plurality of nodes;
   c) determining connection windows from said each node to every other node of said plurality of nodes, ones of said connection windows being re-occurring windows; and
   d) determining an optimum transmission time in each said connection window to a respective one of said plurality of nodes.

43. A method as in claim 42, wherein the step (c) of determining connection windows provides a window matrix indicating windows occurring between said each node and said every other node.

44. A method as in claim 43, wherein matrix entries comprise time varying binary values indicating linked periods from a first node to each other said plurality of nodes, ones of plurality of nodes being in a neighborhood of at least one other node.

45. A method as in claim 43, wherein the transmission propagation times determined in step (b) are time varying.

46. A method as in claim 45, wherein the step (b) of determining transmission propagation times provides a propagation delay matrix indicating time varying propagation delays between said each node and said every other node.

47. A method as in claim 46, wherein the step (d) of determining optimum transmission times comprises generating a path matrix.

48. A method as in claim 47, wherein the step (d) of determining optimum transmission times further comprises determining a storage time above a minimum queuing time for storing a packet arriving at said first node at a given arrival time in said each window until said packet is forwarded to said respective one.

49. A method as in claim 48, before the step (d) of determining optimum transmission times, said method further comprising determining a time dependent minimum/shortest path cost from said each node to each other node.

50. A method as in claim 49, wherein determining said time dependent minimum/shortest path cost comprises recursively analyzing paths to determine an optimal wait time at said each node.

51. A method as in claim 49, further comprising determining storage costs for said each node, a link cost for each pair of linked nodes, a link utilization rate for each link and a corresponding node capacity.

52. A method as in claim 51, further comprising determining total queuing time for each node.

53. A method as in claim 52, wherein determining said time dependent minimum/shortest path cost comprises recursively analyzing the result of waiting at node i to get first contact window to node to j extended by traffic load queuing time to provides an optimal wait time at said each node.

54. A method as in claim 53, wherein multi-layer perceptron (MLP) ANN analysis is used for recursively analyzing.

55. A method as in claim 54, wherein a result from said MLP ANN analysis is compared with a measured delay and an error signal from comparing said measured delay is fed back to adapt said MLP ANN analysis.

56. A method as in claim 54, wherein each node includes a link path table for each destination node in a cyclic 3-tuple set.

57. A method as in claim 42, wherein the re-occurring windows reoccur periodically to one or more of said plurality of nodes.

58. A method as in claim 42, wherein whenever one of said plurality of nodes determines a neighboring node is unresponsive, said node uses agent based routing to reroute paths around said unresponsive neighboring node.

59. A method as in claim 42, wherein ones of said plurality of nodes receiving a majority of communications from Earth nodes have a separate schedule and configuration for sending communications to Earth and for receiving communications from Earth.

* * * * *